(12) United States Patent
Meier

(10) Patent No.: US 6,457,886 B1
(45) Date of Patent: Oct. 1, 2002

(54) CARD STACK LIFTER AND EXCEPTION FEED

(75) Inventor: James R. Meier, St. Paul, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 0 days.

(21) Appl. No.: 09/604,651

(22) Filed: Jun. 27, 2000

(51) Int. Cl.$^7$ ............................ B41J 13/12; B65H 1/06
(52) U.S. Cl. ................... 400/541; 400/521; 400/624; 271/9.09; 271/165; 271/145
(58) Field of Search ................. 400/521, 535, 400/536, 537, 541, 624; 271/145, 9.09, 23, 35, 131, 165, 167; 101/37, 40, 40.1, 43, 44

(56) References Cited

U.S. PATENT DOCUMENTS

| | | | |
|---|---|---|---|
| 4,783,064 A | | 11/1988 | Hayashi ................... 271/131 |
| 4,872,660 A | * | 10/1989 | Kameyama et al. ....... 271/9.02 |
| 5,076,562 A | | 12/1991 | Sai et al. .................. 271/9 |
| 5,145,160 A | * | 9/1992 | Nagashima et al. ....... 271/9.09 |
| 5,156,385 A | * | 10/1992 | Muto et al. ............... 271/3.2 |
| 5,299,796 A | * | 4/1994 | Wooldridge ............. 271/9.01 |

FOREIGN PATENT DOCUMENTS

| | | | |
|---|---|---|---|
| EP | 0774732 A2 | 5/1997 | |
| JP | 58100038 | 6/1983 | |
| JP | 61029984 | 2/1986 | |
| JP | 3-223038 | 10/1991 | ............... 271/9.08 |
| JP | 3-223039 | 10/1991 | ............... 271/9.08 |
| JP | 2000-226126 A | * 8/2000 | |

OTHER PUBLICATIONS

Word Processing System with Magnetic Card Unit, Jan. 1977, IBM TDB, vol. 19, Issue 8, pp. 2856–2859.*

R. E. Hunt; Priority Insertion Card Mechanism; Sep. 1974; IBM TDB: vol. 17, Issue 4, p 958.*

Multiple Path Card Feeding Device; Jun. 1968; IBM TDB: vol. 11, Issue 1, pp. 33–34.*

* cited by examiner

Primary Examiner—Daniel J. Colilla
(74) Attorney, Agent, or Firm—Westman, Champlin & Kelly, P.A.

(57) ABSTRACT

A printer for printing identification cards, in particular, is provided with a hopper for holding a stack of cards to be printed. A card feeder will feed one card at a time from the hopper. The hopper is mounted so that it can be moved away from the card feeder and provide a space into which a single card can be manually fed to the card feeder for processing and printing. The hopper then can be returned to its normal feeding position after the single card has been printed.

18 Claims, 7 Drawing Sheets

CARD STACK LIFTER AND EXCEPTION FEED

CROSS REFERENCE TO RELATED APPLICATIONS

Reference is made to copending application Ser. No. 09/604,459, filed on Jun. 27, 2000 entitled CARD CLEANING ROLLER ASSEMBLY, and to application Ser. No. 09/604,642, filed on Jun. 27, 2000 for DUAL CARD HOPPER FOR CARD PRINTER, both of which are incorporated herein by reference.

BACKGROUND OF THE INVENTION

The present invention relates to an identification (I.D.) card hopper that used with a card printer and to provide cards that are to be printed and which are fed one at a time into the printer. The card hopper can be lifted to a position wherein the card feed is accessible so a single card can be fed under the hopper and into the printer along the card feed path. This permits feeding a selected special size or special shape card without removing all of the cards in the stack in the hopper, and after the exception feed the hopper can be lowered to resume the normal feed from the stack of cards in the card hopper.

Card printers for printing on I.D. cards and similar substrates are widely used and normally a card hopper is provided which holds a stack of cards. Cards are fed from the stack one at a time. With present card hoppers, if a particular different card is to be fed, for a customized print or for other purposes, it has been necessary to remove the entire stack of cards from the hopper, make adjustments for the card size or shape, and then have that card fed from the normal position of the card hopper. Other apparatus requires a special insert apparatus that has to be mounted adjacent a hopper to permit inserting an exception card into a card hopper without removing all the cards.

It has been found that customized or special cards are desired many times, and that the process of removing the stack and replacing it with a card to be printed, is time consuming, and disrupts the flow of printing of the cards on the stack. Unless the cards are properly replaced, errors in printing can occur.

The present invention provides for permitting the feeding of a single card that is different from those in the stack, easily, quickly and reliably.

SUMMARY OF THE INVENTION

The present invention relates to a card feeder for a printer, which will permit feeding an individual card different from those held in a stack in a card hopper.

The cards from a stack in a hopper are normally fed one at a time along a card feed path using a card drive, generally comprising a powered roller. The present invention includes a card hopper that can be moved with the card stack left in place so that there is a space provided between the card stack in the hopper and the card drive. An individual card can be hand fed through the space to the card drive and then to the printer. An input signal can be provided to move the card hopper to provide the space for feeding a card by hand. An individual card is then inserted into the feed path, and a sensor provides a signal so the card drive, as shown, a feed roller, will be started. The individual manually fed card will be gripped and transferred into the printer. The printing program for that individual card can be provided by a manual input to a controller.

As shown, the hopper is lifted and lowered under a central control driving a lift cam. Additionally, in the form shown, a dual hopper is utilized and the entire hopper assembly lifted to provide a card feed space underneath the hopper assembly.

The feeding of the card can be suitably sensed, so that the card is power fed in a normal manner and handled in the printer in a normal way automatically, once the card feed has been initiated.

The ability to feed individual cards apart from the stack in the hopper permits more flexibility in printing, and the ability to easily introduce a custom card or a special purpose card at any time during the printing process.

DETAILED DESCRIPTION OF THE ILLUSTRATIVE EMBODIMENTS

Figure 1:
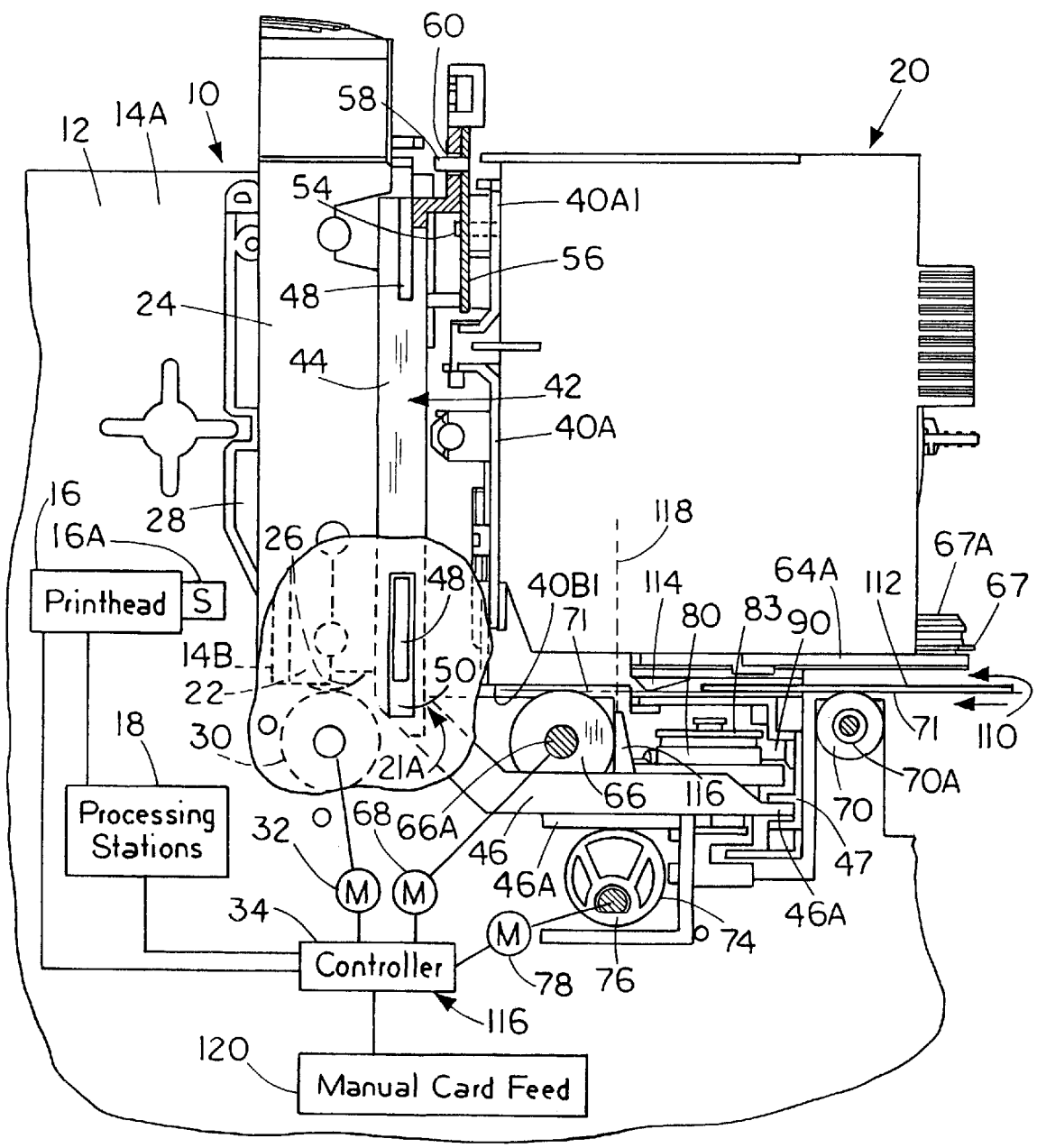
FIG. 1 is a side elevational view of a card feed hopper assembly made according to the present invention mounted on a card feed section of a fragmentarily illustrated printer frame and moved to provide a space to manually feed an individual card.

In FIG. 1, a printer 10 is fragmentarily illustrated, with a side frame panel broken away. The printer 10 includes a printer housing or frame 12 that has side panels 14A and 14B (14B is shown only fragmentarily in FIG. 1) that are spaced apart, and which mount a printing assembly, including a printhead shown only schematically at 16 along with a platen and print ribbon, and further processing stations 18, such as a lamination station, a card inverter or stations for encoding magnetic strips or radio frequency components on the card, and any other desired processing station that performs a function or process on the card subsequent to printing. U.S. Pat. No. 5,941,522 illustrates a printer assembly with auxiliary processing stations. The cards to be printed are fed from a plurality of card hoppers forming a card hopper assembly indicated at 20, and by way of example, a card cleaning roller assembly 22 is positioned to receive cards from a stack in one hopper of the hopper assembly 20, and to move the individual cards toward the printing station 16. A sensor 16A is shown schematically and is used to signal when a card is being fed to the printer. The card cleaning roller assembly 22 includes a housing 24 that houses a cleaning roller 26, and which is mounted in suitable guides 28 on the frame side plates 14A and 14B.

A card drive roller 30 is mounted on the frame side plates 14A and 14B, and is driven from a motor 32. The motor 32 and the printhead 16, and processing stations 18 and the operation and movements of the card hopper assembly 20 are controlled by a central controller 34. The drive roller 30 is a conventional drive roller that is positioned to receive cards from the hopper assembly 20, and to move the cards against the cleaning roller 26 and then move the card to the printhead. Additional drive rollers are used to move the card which has been fed to the printhead to the further processing stations.

The card hopper assembly 20 provides two hoppers to hold stacks of cards, in the form shown, and includes a first card hopper 38, and a second card hopper 40 that are mounted onto a common lift plate 42 at the forward sides of the hoppers. The lift plate 42 is a support that is mounted to travel vertically up and down relative to the printer frame 12, and includes an upright wall 44, and a unitarily formed horizontal plate or tray portion 46 shown in FIGS. 1 and 2 in side view. The lift plate 42 is formed out of plastic, and includes guide ears or tabs 48, that are slidably mounted in provided slots 50 in the side plates 14A and 14B. The lift plate can be used for a single card hopper as well as the dual hoppers. In FIG. 1, the fragmentary showing of the side plate 14B illustrates one of the slots 50. The ears or tabs 48 guide vertical movement of the lift plate 42 and the hopper assembly 20, including hoppers 38 and 40, mounted on the wall 44.

Figure 3:
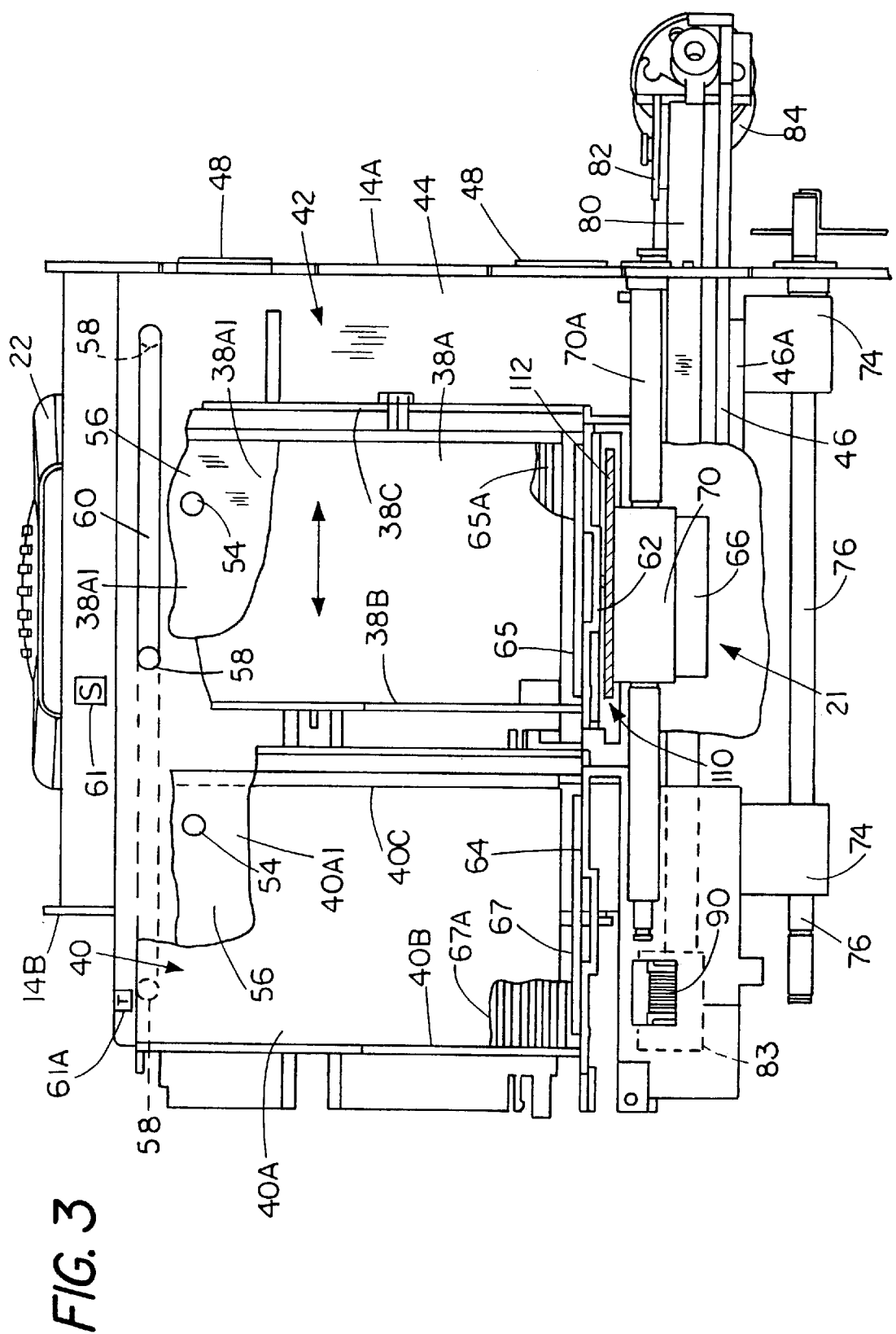
FIG. 3 is a rear elevational view of the card hopper assembly of FIG. 1 with a first card hopper aligned with a card feeding roller and with the hopper assembly in a raised position to provide the manual card feed space.

The hopper assembly 20 is lifted and carried by the lift plate when the hopper assembly is to be moved laterally for aligning one of the respective hoppers 38 and 40 with the printer card feed station 21. In FIG. 3 hopper 38 is aligned with feed station 21 and in FIG. 4 hopper 40 is aligned with feed station 21. The horizontal plate or tray portion 46 is parallel to the plane of cards supported in the hoppers. The plate or tray 46 also has a tab or slider 46A that is guided in a track 47 (see FIG. 1) for support. The track 47 is fixed relative to the printer frame 12. Other supports or tracks can be provided, if desired.

Both of the hoppers 38 and 40 have forward walls shown at 38A and 40A in FIG. 3 for example, and these forward walls are used for mounting the hoppers onto the lift plate 42 at the top portion of the upright wall 44, so that the hoppers will move upwardly and downwardly with the lift plate 42 and also will be slidable laterally on the lift plate. The hoppers 38 and 40 are individually formed, and have side walls 38B and 38C, for the hopper 38, and 40B and 40C for the hopper 40. These walls 38B and 38C and 40B and 40C can be adjusted in width to provide for cards that have different widths of cards.

The front or forward walls 38A and 38B are made in two panels that slide relative to each other, and each of them has a first front panel shown at 38A1 and 40A1, which has suitable fasteners such as flush rivets or the like, one of which is shown in each of the panels 38A1 and 40A1 in FIG. 3 at 54 and these fasteners 54 secure the hopper assembly 20 to a unitary traveler plate 56 that is between the hopper and the upright wall 44 of the lift plate. The traveler plate 56 is supported so it will move from side to side on the lift plate 42, and is supported for up and down movement on the lift plate or frame 42. In order to support the traveler plate 56 on the lift plate wall 44, a plurality of standoff pins 58 (see FIG. 1) are mounted on the plate 56, and project forwardly to fit into and slidably move in a slot 60 that extends transversely along, and which is formed in, upright wall 44 of the lift plate 42.

As shown, there are two standoff or slider pins 58 fixed on the traveler plate 56 and they are positioned in locations so that when hopper assembly 20 is moved to the position where hopper 38 is aligned with the printer card feed section or station 21, as will be explained, the standoff pins are shifted toward one end of the slot 60, and when the hopper assembly 20 is shifted to align the hopper 40 with the card feed station 21, the standoff pins 58 are shifted toward the other end of the slot 60.

The standoff pins 58 form the primary support for the hopper assembly 20 to permit its lateral movement on, and its vertical movement with the lift plate.

The lift plate 42 is raised up and down before the hoppers are moved laterally, in order to provide for clearance for card support walls or bottom trays of the hoppers, including tray 62 at the bottom of the hopper 38, and tray 64 at the bottom of the hopper 40. The lift plate 42 movement provides for the space for the exception feed of the present invention.

The bottom trays 62 and 64 are part of the hoppers and are made to support stacks 65A and 67A of cards 65 and 67 in the hoppers 38 and 40. The trays 62 and 64 have openings to provide clearance for a card drive roller 66 to move against the bottom card in the aligned stack of cards. The roller 66 is mounted on a shaft 66A and driven by a motor 68, and which is rotatably mounted between the frame side plates 14A and 14B. The card feed roller 66 aligns with the card feed path 21A of feed station 21 to the printhead 16. When the respective hopper is in its feeding position, the selected hopper will overlie drive roller 66.

Additionally, there is a card stack support idler roller 70 that is mounted on a shaft 70A. The shaft 70A is rotatably mounted in the printer frame side plates 14A and 14B on suitable bearings, but is not power driven. The idler roller 70 is smaller diameter than the card feed roller 66 and is slightly longer in axial length. A plane lying along the upper side tangent lines of the rollers 66 and 70 forms a support plane represented in line 71 in FIG. 1 for the cards in the stack in the aligned hopper and the plane is on a tangent of the drive roller 30 on the output side of the hoppers. This plane 71 is slightly inclined downwardly toward the hopper outlet opening to help in feeding the cards.

Figure 2:
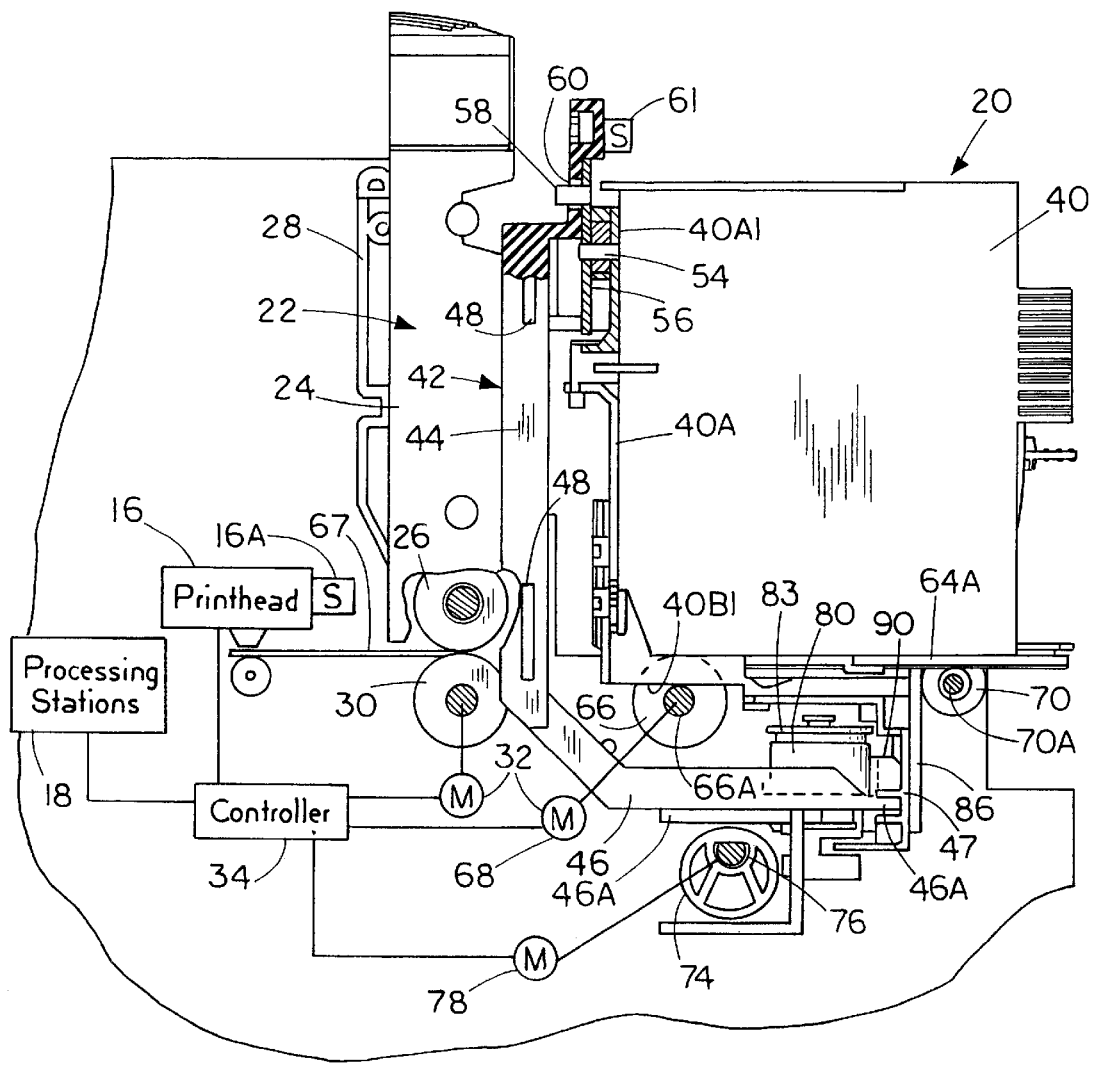
FIG. 2 is a side elevational view similar to FIG. 1 with the card hopper assembly in a lowered position for feeding cards from the hopper.
Figure 4:
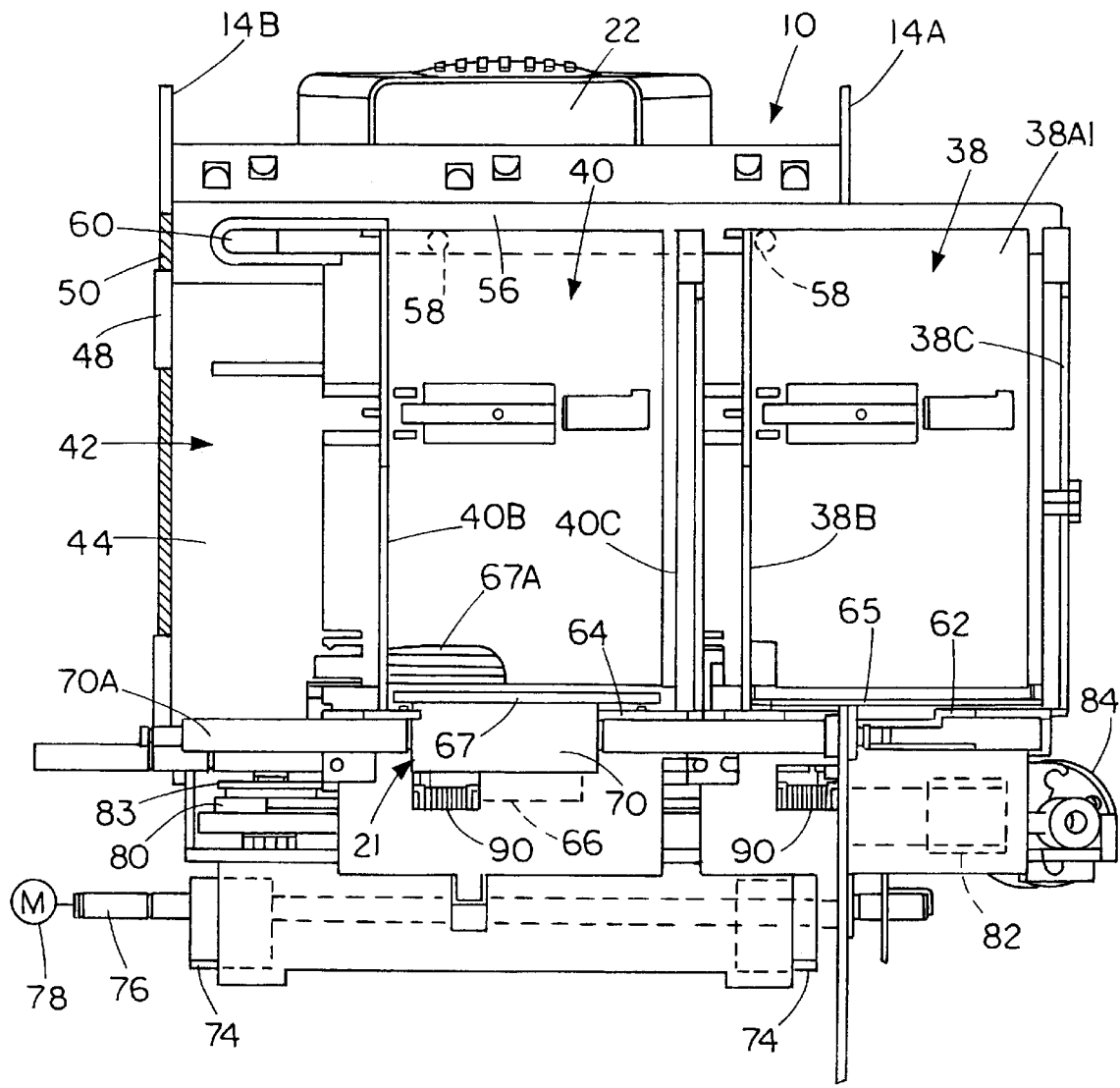
FIG. 4 is a rear view similar to FIG. 3, with the card hopper assembly in a second position with a second card hopper aligned with a card feed roller and lowered as shown in FIG. 2.

The bottom card support trays 62 and 64 are made to have cutout portions for both rollers 66 and 70 that will permit the hoppers and the trays to drop down so the bottom support trays are below the card support plane 71 that is defined by the upper tangent lines of the rollers 66 and 70. When the hopper assembly 20 is in its working or lowered position, which is shown in FIGS. 2 and 4, the stack of cards in the hopper aligned with the card drive roller 66 will be supported on the drive roller 66 and idler roller 70. The bottom card in the aligned stack will rest on rollers 66 and 70.

In order to raise the card hopper assembly 20, so that it can be shifted laterally from side to side, and so that it clears the rollers 66 and 70 for the manual feeding of an individual card, the lift plate 42 is raised and lowered through the use of a cam 74 that is mounted onto a cam shaft 76, which in turn is driven with a controllable, reversible motor 78. The cam 74 is below and acts against the plate or tray portion 46 of the lift plate 42. The cam 74 (there are two cam sections spaced along shaft 76) will ride against a portion 46A of lift tray 46. The cam 74 has the two sections, as shown in FIG. 3 and FIG. 4. The cam 74 is shown in its hopper assembly raised position in FIGS. 1 and 3, where it has raised the lift plate 42 to a position where the bottom card trays 62 and 64 of the card hoppers are above the rollers 66 and 70. This means that the hopper assembly 20 including the hoppers 38 and 40 can be moved laterally (side to side) without interfering with the rollers 66 and 70 and that a manually fed card can be inserted onto the card drive roller. Gravity urges the hopper assembly and lift plate 42 downwardly. A light spring could also be used to provide a downward load.

Figure 6:
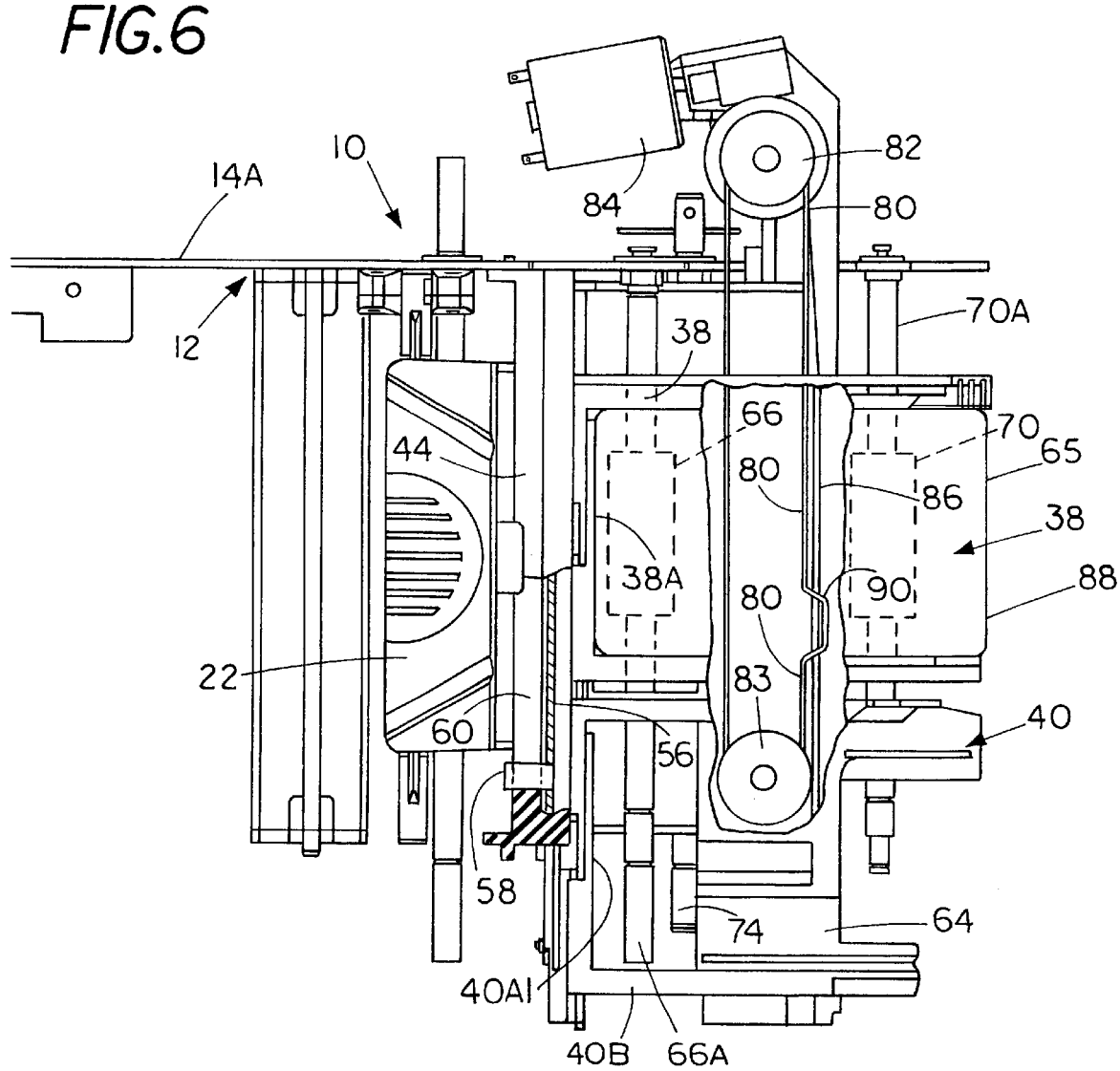
FIG. 6 is a top plan view similar to FIG. 5 with the hopper assembly in a second position, corresponding to the position shown in FIG. 3.

The lateral movement drive for the hopper assembly, which moves the hopper assembly laterally along the lift plate 42 is provided with a drive belt 80, which is an endless belt mounted onto a drive pulley 82 at one side of the printer and on idler pulley 83 at an opposite side of the printer. The belt 80 extends transversely of the printer and hopper assembly. The belt 80 is driven by pulley 82 which in turn is driven by a motor and gear reducer unit 84 on one side of the printer, as can be seen in FIGS. 3 and 6. The belt 80 passes underneath the hoppers 38 and 40. There is a depending wall section 86 that is fixed to the hoppers and can form part of the bottom trays 64 and 62 of the hoppers near an open card hopper inlet end indicated generally at 88 for the hopper assembly 20. The wall section 86 has a belt securing member 90, which permits the belt 80 to loop in and out around the securing member 90 as shown in FIG. 6, so that the hopper assembly 20 will move laterally when the belt 80 is driven through the motor and gear reducer section 84. Other securing devices can be used, such as a rivet.

The motor and gear reducer set 84 is controlled from the central controller 34, so that the shifting of the hopper is done under a programmed control.

When the cam 74 is in its hopper raised position, it lifts the lift plate 42 upwardly. The lift plate 42 is guided by guide ears or tabs 48 sliding in slots 50 of the printer side plates. When the bottom trays 62 and 64 are lifted clear the rollers 66 and 70 and other supports or guides that may be used, the motor 84 can be driven to shift the hopper assembly between the position shown in FIG. 3 where the hopper 38 is in the card feed location and the position shown in FIG. 4, where the hopper 40 is aligned with feed station 21 and the rollers 66 and 70, and thus in the card feed position. A sensor 61 is shown schematically to sense a target (61A in FIG. 3) on the plate 56 to provide a signal indicating which hopper is in the feed station 21. A separate target is used for each hopper.

Figure 5:
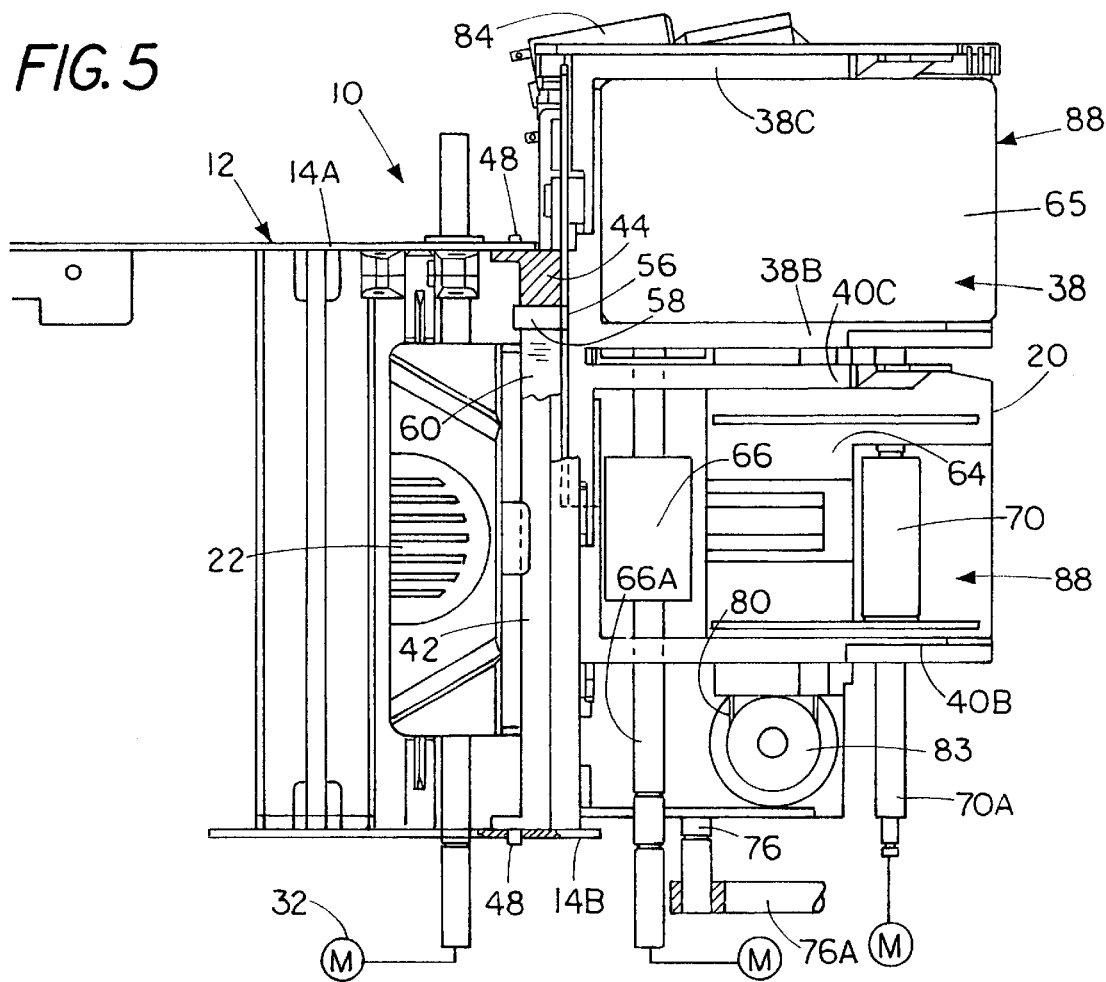
FIG. 5 is a top plan view of the hopper assembly of FIG. 4.

In FIG. 5, the tray 64 is shown in plan view. The tray has cutouts or relief areas so that the roller 70 will pass upwardly through the plane of the tray. The roller 66 is to the rear of the hopper outlet or feed opening end of the tray 64, so that when the hopper assembly is lowered, as shown in FIG. 4, the trays are below the level of the plane 71 lying along the tangent lines on the tops of the rollers 66 and 70. The card stack in the hopper aligned with the rollers 66 and 70 rest on the rollers and the bottom card will be driven or fed when roller 66 is driven.

With the hopper assembly loaded with cards, when the motor 84 is driven, the standoff members 58 will slide in the slot 60 of wall 44 of the lift plate 42. The belt 80 will move the hopper assembly when the hopper assembly is in the proper position so that one or the other of the hoppers 38 and 40 is in the feed station 21 over the rollers 66 and 70 according to the control program of controller 34. The cam 74 is moved to its lowered position by drive motor 78 as shown in FIG. 2. The hopper assembly 20 will drop down, so that the card stack, such as the card stack 65A will be supported on the rollers 66 and 70, and by driving the roller 66 with its motor 68, the lower card 65 will be fed over to the drive roller 30, and can be cleaned with the cleaning roller 26 and then fed to the printhead 16 for printing.

When cards in the other hopper 40 are to be printed, the cam 74 is driven to its raised position lifting lift plate 42 and hopper assembly 20. Then the motor and gear set 84 can be started and the hopper assembly 20 shifted so that the hopper 40 is in position to feed a card.

The card hoppers are bounded by side walls 38B, 38C, and 40B and 40C, as stated. These side walls have lower edges, as shown typically in FIG. 2, where the side wall 40B is illustrated. The side wall 40B has lower edges 40B1 that will ride on the shaft 66A of roller 66, at the forward edge. Each of the side walls 38B, 38C, 40B, and 40C have these lower edges that ride on the shaft 66A, to provide a proper positioning of the card hopper when the hoppers are lowered. Additionally, the trays 62 and 64 have lug portions as shown at 64A in FIG. 2 that ride on the shaft 70. The plastic hopper side walls and plastic bottom trays thus provide guides for proper positioning of the card hopper and the card hopper outlet for alignment with the feed mechanism. The outlet location is established by the surfaces of the shafts for the rollers 66 and 70.

When it is desired to provide for an individual card to be fed independently of the cards in the hopper, the present assembly of the hopper and printer permits such feeding. The controller 34 is programmed so when an appropriate signal is received it will prepare for receiving, feeding and printing a single "exception" card or substrate, which varies from the cards in the hoppers. The exception card feed signal can be a manual input from the operator.

Figure 7:
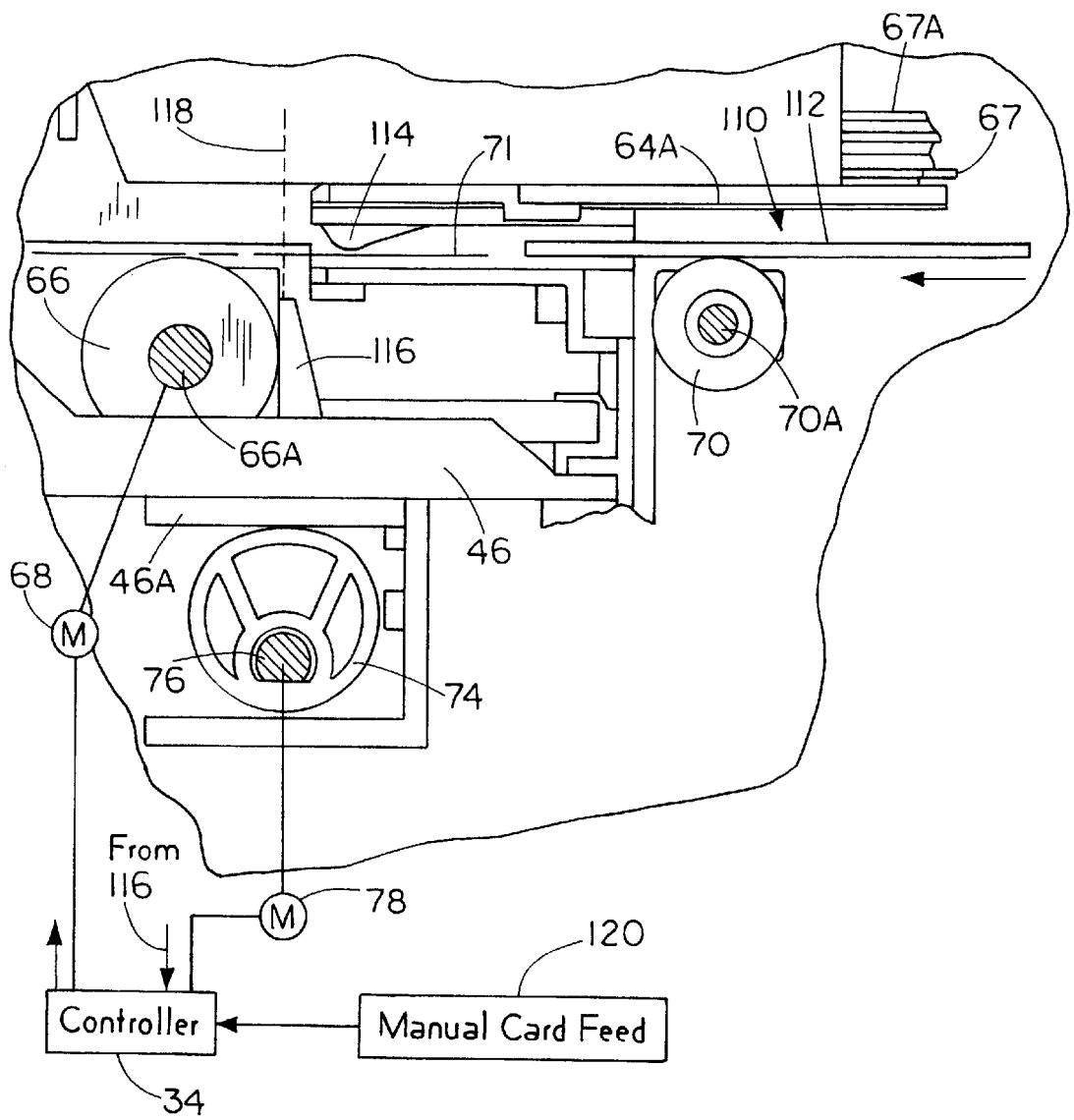
FIG. 7 is an enlarged side view showing the hopper lifted for the manual feeding of a card.

With the hopper in its raised position, as shown in FIGS. 1, 3 and 7, it can be seen that the trays 62 and 64 are raised up from the support plane 71 established by the rollers 66 and 70, and this lifts the card stacks and leaves a gap indicated at 110 between the support plane 71 along the tops of the rollers 66 and 70. The gap 110 is large enough in vertical height between the lower side of the respective trays 62 and 64 and the tops of rollers 70 and 66 to provide a space in which a card, shown at 112 can be manually inserted.

Card 112 can then be passed under the tray 64 or 62 (the tray 62 is in position aligned with the feed path in FIG. 3). The card 112 is placed over the roller 70, and then manually moved forwardly until it engages the drive roller 66. The trays 62 and 64 both have a small individual card feeding guide or tab 114 that protrudes below the tray, and has a surface that will keep the card 112 downwardly against the roller 66, once it is inserted that far.

A suitable sensor such as that shown at 116, can be provided so that when a leading edge of a card 112 that is being fed manually approaches the roller 66, a command will be given to the controller 34 to start rotating the roller 66 under power, along with the roller 30. The sensor line is shown by dotted line 118. The printhead and other components of the printer are also powered, from a suitable power source, and when the card 112 engages the roller 66 it will be power fed to the roller 30 and then through the printhead 16 in a normal manner as described.

The controller 34 can be programmed so that when a manual command is given by a manual card feed input 120, the individual card feed system will be activated, so the "exception" card 112 can be fed and printed according to a known sequence of printing. The sensor 116 insures that the power feed and printer components will be activated at an appropriate time for the exception feed and will not be energized or activated unless the manual control signal is input into the controller.

While dual hoppers are shown in the illustrative embodiment, it is to be understood that a single hopper that supports a single stack of cards will benefit from the card exception feeder as well and can be raised and lowered in the same manner utilizing cams. No lateral slide assembly would be utilized in such a case.

The lateral slide drive motor and belts would be eliminated, but the cam 74 or other device for moving the card hopper would move, as shown, raise and lower the hopper in a suitable manner. The use of a lift plate as disclosed would not be necessary, and the lift could be operated directly on a hopper. When a single card hopper is utilized, the hopper lift can be made in any desired way. The single hopper would be lifted only when a separate special card is being introduced. This would mean the mechanism could be simpler, because no transverse travel of the hopper would be necessary and only a lifting action would be provided for the exception feed. The lift for the hopper also can be a manual knob or drive lever 76A on the shaft 76 (FIG. 5).

The exception feed also can be done automatically with an additional sensor that would indicate when the individual card that is to be manually or hand fed is approaching the feed slot or gap 110 that is to be formed, and then the controller would go into the exception feed mode, lifting the hopper, and powering the drive rollers for the card that is being manually fed. The program for the controller 34 also can have an individual print schedule for manual lifting of the hopper and feeding of a card.

The exception card feed sequence would be to indicate a manual card feed from input 120, and that would cause the card hopper used for the automatic feed to raise up. As shown, motor 78 would be driven and cam 74 would be moved to the hopper lift position shown in FIGS. 1 and 3. The controller would be set for manual feed and the card 112 would be inserted in space or gap 110. The signal from sensor 116 would then be used to start roller 66 to drive card 112 and run the printer for one or more cards.

Although the present invention has been described with reference to preferred embodiments, workers skilled in the art will recognize that changes may be made in form and detail without departing from the spirit and scope of the invention.

What is claimed is:

1. A printer assembly for printing on identification cards, and having a frame, a hopper mounted on said frame for supporting a stack of cards to be fed, said hopper being aligned with a card feed path, a card feeder for engaging a lower card in the hopper and feeding the card to the printer, wherein the improvement comprises an exception feed assembly including a drive for moving the hopper away from the card feed path to provide an opening for access for a manually fed card to the card feeder, whereby a card can be placed into the opening in position to be fed by the card feeder.

2. The printer assembly of claim 1, wherein said card feeder comprises a drive roller, and wherein the movement of the hopper away from the card path permits access to the drive roller for a manually fed card.

3. The printer assembly of claim 1, wherein said card feeder comprises a drive roller, and wherein the hopper is moved by lifting it to move the hopper away from the drive roller, thereby providing the opening between the hopper and the drive roller into which the manually fed card can be introduced.

4. The printer assembly of claim 1 and a sensor for sensing when a manually fed card is placed in the card path through the opening after the hopper has been moved away from the card path.

5. The printer assembly of claim 1, wherein said card feeder comprises a drive roller, and a card support idler roller spaced from the drive roller in a direction away from the printer, the hopper being moved to space the card stack from a card feed plane defined by upper surfaces of the drive roller and the idler roller, said opening being of size to permit a card to be inserted manually over the idler roller toward the drive roller, and a sensor for sensing when a card is manually inserted in the space above the card feed plane.

6. The printer assembly of claim 5 and a guide tab on the hopper protruding into the space, and engaging an upper surface of said card that is manually inserted to hold the card against the drive roller.

7. The printer assembly of claim 6, wherein said hopper includes a bottom tray for supporting the card stack, and said tray moving the card stack away from the card feed plane.

8. The printer assembly of claim 5 and a cam member for lifting the hopper to move the card stack away from the card feed plane.

9. The printer assembly of claim 6, wherein said guide tab is supported on said bottom tray.

10. The printer assembly of claim 1, wherein said hopper comprises two hopper sections, and a lateral drive for driving the hopper to place one of the hopper sections aligned with the card feeder, said drive being operable when the hopper has been lifted away from the card feed path.

11. A method of feeding individual cards into a printer that is provided with a hopper for normally feeding cards one at a time from a card stack using a card feeder, including moving the hopper to a position so that the card stack is spaced from the card feeder, inserting a card held by hand in the space between the card stack and the card feeder for manually feeding a card directly into the card feeder and to the printer.

12. The method of claim 11, further including providing a drive roller for forming the card feeder, and wherein spacing the stack from the drive roller and inserting a card includes moving the individual card by hand to engage with the drive roller for driving the individual card into the printer.

13. The method of claim 11 including providing a signal to the card feeder to cause the hopper to move to the position where the card stack is spaced from the card feeder.

14. The method of claim 13 including the step of providing the signal as a manual input to a controller controlling the card feeder and the printer.

15. A printer and feeder assembly for printing on substrates, comprising a frame, a hopper mounted on said frame for supporting a stack of a plurality of individual substrates to be fed to the printer, said hopper being aligned with a substrate feed path, a feeder for engaging a lower substrate in the hopper and feeding the lower substrate to the printer, wherein the improvement comprises an exception feed assembly including a drive for moving the hopper away from the substrate feed path to provide an opening for access for a manually fed hand held substrate to the substrate feeder, whereby a substrate can be placed by hand into the opening in position to be engaged and fed by the substrate feeder.

16. The printer assembly of claim 15, wherein said card feeder comprises a drive roller below the hopper, and wherein the hopper is lifted to move the hopper away from the drive roller, thereby providing the opening between the hopper and the drive roller into which the manually fed hand held substrate can be introduced.

17. The printer assembly of claim 15 and a sensor for sensing when a manually fed card is placed in the substrate feed path through the opening after the hopper has been moved away from the substrate feed path.

18. The printer assembly of claim 15, wherein said hopper comprises two hopper sections, and a lateral drive for driving the hopper to place one of the hopper sections aligned with the substrate feed path, said drive being operable when the hopper has been lifted away from the substrate feed path.

* * * * *